US012759094B2

(12) United States Patent
Tan et al.

(10) Patent No.: US 12,759,094 B2

(45) Date of Patent: Oct. 13, 2026

(54) BOND HEAD HEATER INCORPORATING FLUID CHAMBER FOR COOLING

(71) Applicant: ASMPT Singapore Pte. Ltd., Singapore (SG)

(72) Inventors: Chujie Tan, Hong Kong (CN); Man Lee, Hong Kong (CN); Cheuk Wah Tang, Hong Kong (CN); Ka Shing Kwan, Singapore (SG)

( * ) Notice: Subject to any disclaimer, the term of this patent is extended or adjusted under 35 U.S.C. 154(b) by 211 days.

(21) Appl. No.: 18/643,573

(22) Filed: Apr. 23, 2024

(65) Prior Publication Data

US 2025/0326073 A1 Oct. 23, 2025

(51) Int. Cl.

*B23K 37/00* (2025.01)
*B23K 37/003* (2025.01)
*F28F 25/06* (2006.01)
*F28F 25/10* (2006.01)

(52) U.S. Cl.

CPC ............ *B23K 37/003* (2013.01); *F28F 25/06* (2013.01); *F28F 25/10* (2013.01)

(58) Field of Classification Search

CPC ...... B23K 3/085; B23K 20/023; B23K 20/26; F28D 2021/0028; H05K 7/20272; H05K 7/20281; B05B 1/005; B05B 12/18

See application file for complete search history.

(56) References Cited

U.S. PATENT DOCUMENTS 3,739,556 A * 6/1973 Waters .................. F28F 25/087 96/356
4,964,943 A * 10/1990 Kruger .................. B30B 15/064 423/384
9,057,567 B2 * 6/2015 Lyon ..................... H01L 23/473
9,553,069 B2 * 1/2017 Han ........................ H01L 24/97
10,192,847 B2 * 1/2019 Ma .......................... H01L 24/75
10,312,214 B2 * 6/2019 Law ......................... H01L 24/75
10,350,692 B2 * 7/2019 Seyama ................. B23K 3/047
11,508,688 B2 * 11/2022 Seyama ................. H01L 24/75
11,903,171 B2 * 2/2024 Chen .................. H05K 7/20345
2002/0113142 A1 * 8/2002 Patel ................... H01L 23/4735 239/128
2002/0163782 A1 * 11/2002 Cole ................... H01L 23/4735 361/700
2006/0023424 A1 * 2/2006 Nakamura ......... G01R 31/2875 361/699
2012/0088362 A1 * 4/2012 Hwang .................. H01L 24/75 438/615

(Continued)

OTHER PUBLICATIONS

JP3172942B2 computer English translation (Year: 2001).*

*Primary Examiner* — Erin B Saad

(74) *Attorney, Agent, or Firm* — OSTROLENK FABER LLP

(57) ABSTRACT

A cooling system provided for a bond head heater including a heater plate which is operative to heat a die that is being held adjacent to the bond head heater has at least one fluid chamber thermally coupled to the heater plate. The fluid chamber includes an enclosure for containing a fluid, and a fluid inlet and a fluid outlet coupled to the fluid chamber. Fluid is introduced into the fluid chamber through the fluid inlet and is exhausted from the fluid chamber through the fluid outlet. The fluid is configured to flow through a heat transmission path lying substantially next to the heater plate when the fluid is travelling between the fluid inlet and the fluid outlet.

18 Claims, 3 Drawing Sheets

(56) References Cited

U.S. PATENT DOCUMENTS

| | | | | |
|---|---|---|---|---|
| 2013/0240115 | A1* | 9/2013 | Horng | H01L 24/75 156/64 |
| 2014/0140006 | A1* | 5/2014 | Kuhlmann | H01L 23/00 165/104.33 |
| 2014/0202636 | A1* | 7/2014 | Mayr | B30B 15/34 156/378 |
| 2014/0204532 | A1* | 7/2014 | Mehring | H05K 7/20345 361/689 |
| 2014/0367898 | A1* | 12/2014 | Hebert | C21D 9/0068 266/44 |
| 2015/0171047 | A1* | 6/2015 | Malatkar | H01L 24/75 156/583.1 |
| 2015/0173209 | A1* | 6/2015 | Dhavaleswarapu | B23K 20/002 228/46 |
| 2015/0364440 | A1* | 12/2015 | Ma | H01L 24/75 165/80.1 |
| 2016/0116217 | A1* | 4/2016 | Law | H01L 24/75 239/69 |
| 2018/0068973 | A1* | 3/2018 | Law | B23K 1/20 |
| 2021/0351108 | A1* | 11/2021 | Diglio | H01L 23/427 |
| 2021/0398935 | A1* | 12/2021 | Kim | H01L 24/73 |
| 2022/0124942 | A1* | 4/2022 | Tan | H05K 7/20272 |

* cited by examiner

BOND HEAD HEATER INCORPORATING FLUID CHAMBER FOR COOLING

FIELD OF THE INVENTION

The invention relates to semiconductor die bonding, and in particular, to improvements in heating and cooling rates for a bond head heater of a die bonding apparatus.

BACKGROUND AND PRIOR ART

It is typically necessary to heat either a substrate, a die, or both during semiconductor die bonding operations. In some applications such as thermocompression die bonding, heat is provided to the die, although heat is also usually provided to the substrate from a work chuck on which the substrate rests. A bond head heater is therefore important to provide heat to a die being held by the bond head in relation to die bonding processes.

During a die bonding process, the bond head heater which is incorporated in the bond head heats the die while the die is being held by the bond head. The bond head then presses the die against a bonding site on a substrate with a predetermined force while heat is being supplied according to a certain temperature profile. Since the bond head heater should be cooled after bonding of the die has been completed and before starting a new bonding cycle, it would be beneficial to increase the heating and cooling rates of the bond head heater so as to improve productivity.

For increasing the heating rate, a pulse heater may be applied for heating the bond head heater, while for the cooling process, conventional methods to actively cool the bond head heater include blowing compressed gas onto the bond head heater. An example of such an approach is described in U.S. Pat. No. 10,192,847B2 entitled "Rapid Cooling System for a Bond Head Heater". However, the cooling rate achievable by using only compressed gas is limited and is not much better than employing liquid cooling, while the consumption of compressed gas is relatively large as compared to any improvement gained.

Another approach is described in U.S. Pat. No. 10,312,214B2 entitled "Atomization Mechanism for Cooling a Bond Head", wherein water sprays are generated directly onto a heater plate on a bond head heater in order to cool the heater plate. In this approach, a sealing system for the water sprays generated in the bond head heater uses elastomer O-rings, which limits the operational temperature of the bond head heater to temperatures below 300° C., in order to avoid damage to the elastomer material which is prone to melting at higher temperatures. Certain bonding processes require temperatures that easily exceed the 300° C. temperature limitation, so such a cooling system would not be suitable for such processes.

It would be beneficial to develop a bond head heater cooling system that avoids the above shortcomings of the prior art.

SUMMARY OF THE INVENTION

It is thus an object of the invention to seek to provide a cooling system having improved cooling efficiency and which can be operated at higher temperatures as compared to prior art approaches.

According to a first aspect of the invention, there is provided a cooling system for a bond head heater including a heater plate that is operative to heat a die that is being held adjacent to the bond head heater, the cooling system comprising: at least one fluid chamber including an enclosure for containing a fluid, the at least one fluid chamber being thermally coupled to the heater plate; a fluid inlet and a fluid outlet coupled to the fluid chamber such that fluid is introduced into the fluid chamber through the fluid inlet and exhausted from the fluid chamber through the fluid outlet; and a heat transmission path lying substantially next to the heater plate through which the fluid is configured to flow when the fluid is travelling between the fluid inlet and the fluid outlet.

According to a second aspect of the invention, there is provided a bond heat heater assembly comprising: a heater plate that is operative to heat a die that is being held adjacent to the bond head heater; at least one fluid chamber including an enclosure for containing a fluid, the at least one fluid chamber being thermally coupled to the heater plate; a fluid inlet and a fluid outlet coupled to the fluid chamber such that fluid is introduced into the fluid chamber through the fluid inlet and exhausted from the fluid chamber through the fluid outlet; and a heat transmission path lying substantially next to the heater plate through which the fluid is configured to flow when the fluid is travelling between the fluid inlet and the fluid outlet.

It would be convenient hereinafter to describe the invention in greater detail by reference to the accompanying drawings which illustrate specific preferred embodiments of the invention. The particularity of the drawings and the related description is not to be understood as superseding the generality of the broad identification of the invention as defined by the claims.

BRIEF DESCRIPTION OF THE DRAWINGS

A specific example of a cooling system in accordance with the invention will now be described with reference to the accompanying drawings, in which.

DETAILED DESCRIPTION OF THE PREFERRED EMBODIMENTS OF THE INVENTION

Figure 1:
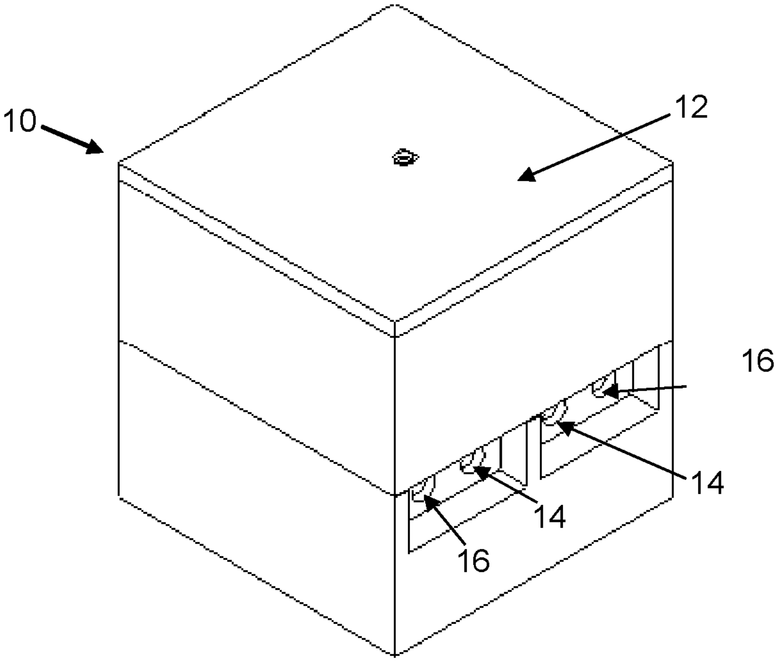
FIG. 1 is an isometric view of a bottom side of a bond head heater according to the preferred embodiment of the invention that is configured to hold a semiconductor die in use.

FIG. 1 is an isometric view of a bottom side of a bond head heater 10 according to the preferred embodiment of the invention that is configured to hold a semiconductor die (not shown) in use. The bond head heater 10 has a heater plate 12 that is installed on its bottom surface, on which a collet (not shown) is further mountable.

The collet is configured to hold a semiconductor die, typically using a vacuum suction force applied through grooves on a surface of the collet. While the collet is holding the semiconductor die using vacuum suction, the heater plate 12 is operative to heat up the semiconductor die that is being held adjacent to the bond head heater through the transmission of heat by conduction to the semiconductor die through the collet. The bond head heater 10 has a cooling system which includes multiple fluid inlets 14 for introducing cooling fluid and fluid outlets 16 exhausting heated cooling fluid, as will be explained in greater detail below.

Figure 2:
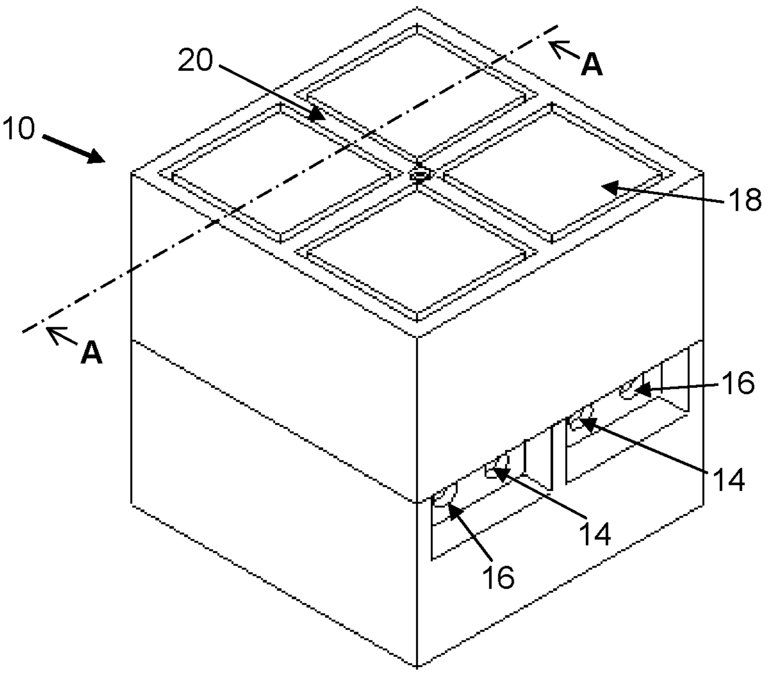
FIG. 2 is an isomeric view of the bond head heater of FIG. 1 wherein a heater plate has been removed to reveal a cooling assembly used for cooling the heater plate.

FIG. 2 is an isomeric view of the bond head heater 10 of FIG. 1 wherein the heater plate 12 has been removed to reveal a cooling system or cooling assembly 18 used for cooling the heater plate 12. The cooling assembly 18 incorporates at least one metallic fluid chamber including an enclosure for containing a fluid, and the at least one metallic fluid chamber is thermally coupled to the heater plate 12. Illustrated in FIG. 2 is an embodiment where there is a total of four metallic fluid chambers comprised in the cooling assembly 18, each of the fluid chambers occupying a space that is coextensive with approximately a quadrant of the bond head heater 10 behind the heater plate 12. Each fluid chamber is separated from another fluid chamber by a chamber wall 20. Each fluid inlet 14 is configured to introduce a cooling fluid to a single fluid chamber, whereas each fluid outlet 16 is configured to exhaust the cooling fluid from a single fluid chamber.

Figure 3:
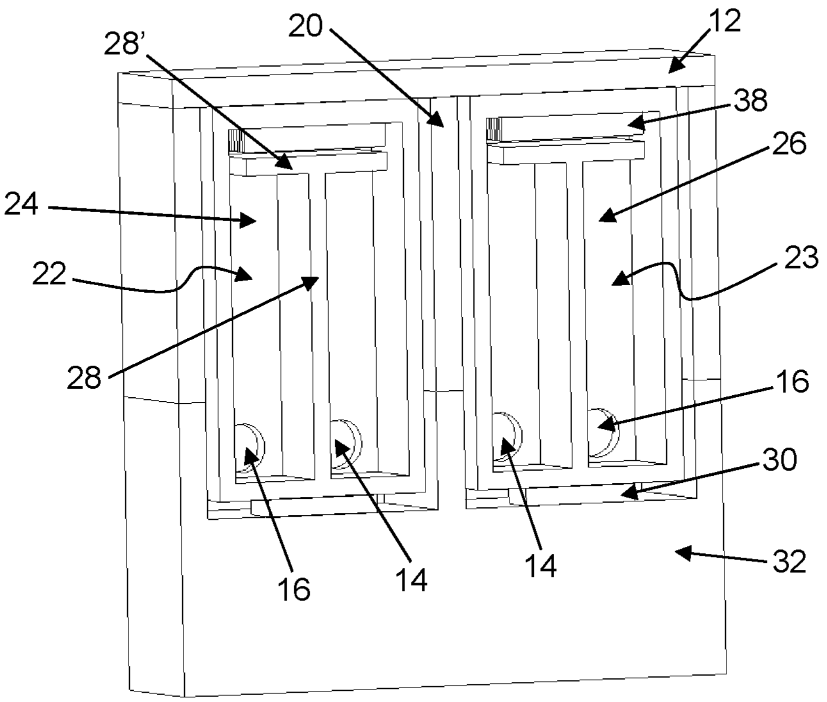
FIG. 3 is an isometric cross-sectional view of the bond head heater looking along line A-A of FIG. 2, illustrating two fluid chambers comprised in the cooling assembly.

FIG. 3 is an isometric cross-sectional view of the bond head heater 10 looking along line A-A of FIG. 2, illustrating two fluid chambers 24, 26 comprised in the cooling assembly 18. In this illustration, cross-sections of two of the plurality of metallic fluid chambers are shown, namely a first fluid chamber 24 and a second fluid chamber 26. Each fluid inlet 14 may, in the preferred embodiment, introduce fluid in the form of cooling spray to enter a fluid chamber 24, 26. The cooling spray is caused to move along a height of each fluid chamber 24, 26 towards the heater plate 12 in order to cool the heater plate 12.

While only two of the fluid chambers 24, 26 are illustrated in detail, the other fluid chambers may be of a similar structure. The multiple fluid chambers are beneficial for expediting the cooling process, as well as for creating different cooling zones for the heater plate 12 where independent control is possible, so that temperatures at different parts or zones of the heater plate 12 may be more precisely controlled.

A partition is positioned in each fluid chamber that generally separates the fluid chamber into a first segment 22 where the flid inlet 14 is located, and a second segment 23 where the fluid outlet 16 is located. Advantageously, the said partition is in the form of a substantially T-shaped partition 28 that is arranged within each fluid chamber 24, 26 to divide the fluid chamber 24, 26 into the two segments 22, 23. A substantially horizontal portion 28' of the T-shaped partition 28 is substantially parallel to a surface of the bond head heater 10 on which the heater plate 12 is mounted. The horizontal portion 28' concentrates a flow of fluid in the form of spray particles 34 along a space containing a heat transmission path 36 substantially next to a surface of the heater plate 12 through which the spray particles 34 are configured to flow when the spray particles 34 are travelling between the fluid inlet 14 and fluid output 16.

By concentrating the flow of spray particles 34, it is possible to increase heat removal efficiency by the spray particles 34 from the heater plate 12, as well as expedite the removal of heat away from the heater plate 12 by increasing a flow speed of the spray particles 34 in the area next to the heater plate 12. It should be appreciated that the flow speed of the spray particles 34 along the heat transmission path 36 would be higher than their flow speeds at the fluid inlet 14 and fluid output 16 respectively. After flowing along the heat transmission path 36 past the top of the horizontal portion 28' of the T-shaped partition 28 (which is at a proximal end of the fluid chamber), the spray particles 34 move towards the fluid outlet 16 (which, together with the fluid inlet 14, is located adjacent to a distal end of the fluid chamber opposite to the proximal end) to be drained in order to carry heat away from the bond head heater 10.

Also shown in FIG. 3 are the chamber walls 20 separating each fluid chamber 24, 26 from other fluid chambers as well as an external environment. The chamber walls 20 function as insulators between the different metallic fluid chambers 24, 26 to thermally isolate them from one another. Moreover, the separation of the fluid chambers 24, 26 by respective walls facilitate assembly of the bond head heater 10, and allows its structure as a whole to be simple and symmetrical in design. One or more resilient members 30, which may be in the form of springs or other elastic element, are positioned between each fluid chamber 24, 26 and a supporting surface or supporting block 32 of the bond head heater 10 in order to bias the fluid chambers of the cooling assembly 18 against the surface next to the heater plate 12. This ensures that each fluid chamber 24, 26 is always in contact with a surface of the heater plate 12 so as to maximize heat transfer by thermal conduction.

Figure 4:
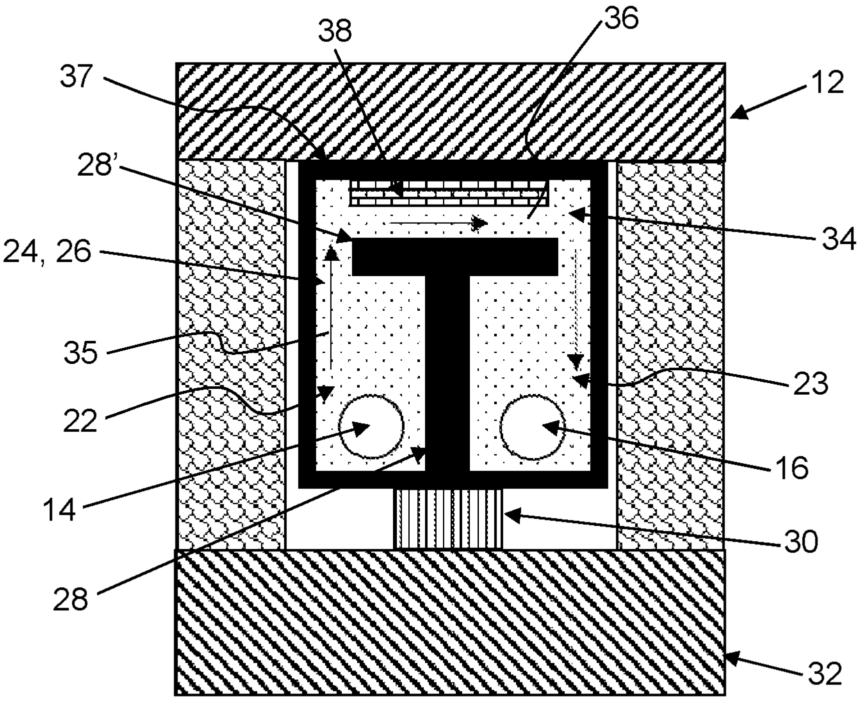
FIG. 4 is a schematic cross-sectional view of the bond head heater illustrating in more detail a single fluid chamber according to the preferred embodiment of the invention.

FIG. 4 is a schematic cross-sectional view of the bond head heater 10 illustrating in more detail a single fluid chamber according to the preferred embodiment of the invention. Spray particles 34 are introduced into the fluid chamber via the fluid inlet 14 when cooling of the heater plate 12 is required. The spray particles 34 are made to flow towards the horizontal portion 28' of the T-shaped partition 28 and the heater plate 12 along a predetermined flow direction 35.

The spray particles 34 are made to flow from the first segment 22 of the fluid chamber 24, 26 through the heat transmission path 36, which is an elongated narrow pathway or opening formed between the horizontal portion 28' and the surface next to the heater plate 12, to enter the second segment 23 of the fluid chamber 24, 26. In order to further facilitate heat transfer from the heater plate 12 to the spray particles 34, additional features such as fins 38 may be formed on the surface of the cooling assembly 18 next to the heater plate 12 and heat transmission path 36. These features may, for instance, increase a surface area whereat heat transfer occurs in order to increase the rate of heat transfer. Contact thermal resistance may also be further reduced by applying a material 37 having a high thermal conductivity between the heater plate 12 and the cooling assembly 18. Such a high thermal conductivity material may be in the form of a liquid, paste or soft solid.

After the spray particles 34 have received heat transmitted from the fins 38, the spray particles 34 move towards the fluid outlet 16 and are exhausted from the fluid chamber 24, 26 through the fluid outlet 16. For maximizing contact between the fluid chamber 24, 26, fins 38 and the heater plate 12, one or more resilient members 30 are positioned between the fluid chamber 24, 26 and the supporting block 32. Once the cooling process has been completed, the introduction of spray particles 34 into the cooling assembly 18 is stopped, so that the heater plate 12 may be reheated in preparation for the next bonding cycle.

Figure 5:
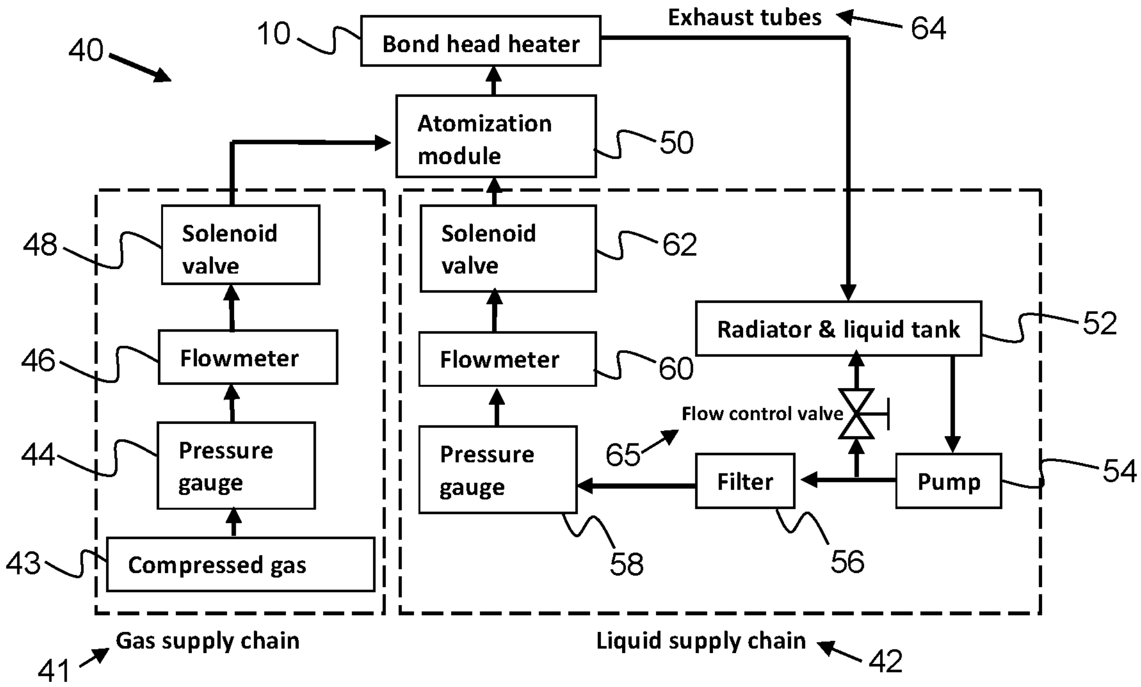
FIG. 5 illustrates respective physical connections between various components of a cooling system comprised in the bond head heater.

FIG. 5 illustrates respective physical connections between various components of a cooling system 40 comprised in the bond head heater 10. A supply of spray particles 34 is generated primarily from a combination of a gas supply chain 41 and a liquid supply chain 42, which give rise to a resultant mixture of compressed gas and liquid. In the gas supply chain 41, a stream of compressed gas 43 is generated. The gas may be air. A pressure gauge 44 and a flowmeter 46 are in communication with the stream of compressed gas 43 to monitor its flow. A first release valve, such as a solenoid valve 48, is connected to an atomization module 50, and is utilized to control a release of compressed gas 43 to the atomization module 50, which is in turn operative to generate spray particles 34.

The liquid supply chain 42 includes a radiator and liquid tank 52 that has a pump 54 connected to it. The liquid that is contained in the radiator and liquid tank 52 and used for cooling can be water, or another liquid with a high water content to enhance its heat carrying capacity. Liquid from the pump 54 is passed through a filter 56 to remove contaminants, and a pressure gauge 58 and flowmeter 60 are arranged in communication with the pump 54 to monitor the flow of liquid. A second release valve, such as a solenoid valve 62, is connected to an atomization module 50, and is utilized to control a release of liquid to the atomization module 50, to which the gas supply chain 41 is also connected to.

At the start of a cooling process, the spray particles 34 generated by the atomization module 50 (which is primarily in the form of cooling liquid that is carried by the compressed gas 43) are introduced into the bond head heater 10 through the fluid inlet 14. The spray particles 34 that are heated by the heater plate 12 may evaporate or may be exhausted from the fluid outlet 16 and directed back to the radiator and liquid tank 52 by exhaust tubes 64. At the radiator and liquid tank 52, the heated spray particles 34 are converted into a liquid collected, whether by condensation or cooling, for recycling before the liquid is provided again to the liquid supply chain 42. Furthermore, a flow control valve 65 offers the option of supplying liquid released from the pump 54 back into the radiator and liquid tank 52.

Figure 6:
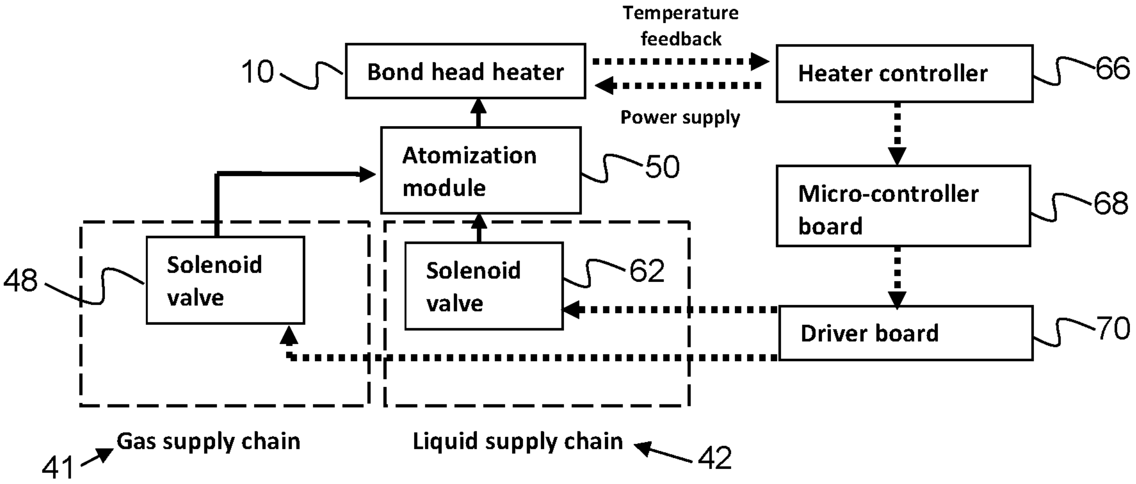
FIG. 6 illustrates a control system for controlling the operations of the cooling system illustrated in FIG. 5.

FIG. 6 illustrates a control system for controlling the operations of the cooling system 40 illustrated in FIG. 5. A heater controller 66 controls a power supply to a pulse or other heater that is used to rapidly heat up the heater plate 12 to an operating temperature. The heater controller 66 also receives temperature feedback from the heater plate 12 to monitor the temperature of the heater plate 12, so as to ensure that the heater plate 12 is maintained at the correct temperatures at all times.

A micro-controller board 68 receives temperature input signals from the heater controller 66 to determine whether cooling spray needs to be generated to start cooling the heater plate 12 at the appropriate time. When it is determined that cooling is needed, the micro-controller board 68 would activate one solenoid valve 62 to release liquid to the atomization module 50, and also trigger a driver board 70 to activate the other solenoid valve 48 to simultaneously release compressed gas 43 to the atomization module 50. For the duration that the heater plate 12 of the bond head heater 10 is being cooled, the heater controller 66 continuously receives temperature feedback from the heater plate 12 to determine when the heater plate 12 is sufficiently cooled to the correct temperature, after which cooling is stopped and the pulse or other heater is activated again to heat up the heater plate 12. Thus, closed-loop control is advantageously provided for the cooling system 40 in the preferred embodiment of the invention.

It should be appreciated that the bond head heater 10 according to the described embodiment of the invention has various benefits over the prior art. As cooling gas is not being directly blown onto the heater plate 12, a large gas pressure being exerted onto a surface of the heater plate 12 is avoided such that any deformation or warpage caused by the cooling process is minimal. Due to the effective avoidance of deformation or warpage, a thickness of the heater plate 12 can even be reduced to further improve the cooling rate.

Generally, the metallic fluid chambers that are being utilized are simpler in design than conventional metallic blocks containing fluid channels, as there is no need for complex channel arrangements or complex machining. Cost savings, faster production times and easier maintenance are therefore possible. Fluid chambers are also more adaptable to changing operating conditions or variable flow rates.

Moreover, tight sealing for the spray particles 34 can be achieved without the incorporation of elastomers such as high temperature O-rings or gaskets. Thus, the risk of liquid leakage is reduced by avoiding the use of elastomers that might be points of weakness in the structure. Most importantly, the maximum operating temperature of the bond head heater 10 is not limited by the effective operational temperature of such O-rings or gaskets, which is about 300° C. or less.

Furthermore, the cooling rate of the bond head heater 10 using cooling sprays 34 is far superior to cooling using only cooling gases. For instance, a cooling rate of 54° C. per second on a 75 mm bond head heater is achievable, as compared with a gas-only cooling rate of about 15° C. per second, which is a vast improvement.

The invention described herein is susceptible to variations, modifications and/or additions other than those specifically described and it is to be understood that the invention includes all such variations, modifications and/or additions which fall within the spirit and scope of the above description.

The invention claimed is:

1. A cooling system for a bond head heater including a heater plate that is operative to heat a die that is being held adjacent to the bond head heater, the cooling system comprising:

at least one fluid chamber, the at least one fluid chamber including an enclosure for containing a fluid, the at least one fluid chamber being thermally coupled to the heater plate to allow heat transfer by thermal conduction;

a fluid inlet and a fluid outlet coupled to the at least one fluid chamber such that fluid is introduced into the at least one fluid chamber through the fluid inlet and exhausted from the at least one fluid chamber through the fluid outlet;

a heat transmission path lying substantially next to the heater plate through which the fluid is configured to flow when the fluid is travelling between the fluid inlet and the fluid outlet, and a partition positioned within the enclosure to define the heat transmission path to increase a flow speed of the fluid as it passes the heater plate.

2. The cooling system as claimed in claim 1, wherein the at least one fluid chamber includes a plurality of fluid chambers, each fluid chamber being thermally coupled to the heater plate to allow heat transfer by thermal conduction.

3. The cooling system as claimed in claim 2, wherein a total of four fluid chambers are thermally coupled to the heater plate, each fluid chamber occupying a space that is coextensive with a quadrant of the heater plate.

4. The cooling system as claimed in claim 2, wherein each fluid chamber is separated from another fluid chamber by a chamber wall that is operative to thermally insulate respective fluid chambers from each other.

5. The cooling system as claimed in claim 1, wherein the partition positioned in the enclosure separates the at least one fluid chamber into a first segment where the fluid inlet is located, and a second segment where the fluid outlet is located.

6. The cooling system as claimed in claim 5, wherein the heat transmission path is located along a space through which fluid travels from the first segment to the second segment.

7. The cooling system as claimed in claim 6, wherein the space is in the form of an elongated pathway between the first and second segments.

8. The cooling system as claimed in claim 7, wherein the partition is in the form of a substantially T-shaped partition, with a substantially horizontal portion of the T-shaped partition forming the elongated pathway with a wall of the fluid chamber next to the heater plate.

9. The cooling system as claimed in claim 7, wherein a flow speed of the fluid is higher in an area of the elongated pathway than at the fluid inlet and at the fluid outlet.

10. The cooling system as claimed in claim 6, wherein the fluid inlet and the fluid outlet are located adjacent to a distal end of the at least one fluid chamber, the distal end being opposite to a proximal end of the at least one fluid chamber that is adjacent to the heat transmission path.

11. The cooling system as claimed in claim 6, further comprising fins formed on a surface next to the heat transmission pathway for increase a rate of heat transfer.

12. The cooling system as claimed in claim 1, further comprising one or more resilient members positioned between the at least one fluid chamber and a supporting surface of the bond head heater in order to bias the at least one fluid chamber in a direction of the heater plate for enhancing thermal conductivity therebetween.

13. The cooling system as claimed in claim 1, further comprising a thermal conductive material applied between the heater plate and the fluid chamber, such material being in the form of a liquid, paste or soft solid.

14. The cooling system as claimed in claim 1, wherein the fluid comprises spray particles generated from a mixture of compressed gas and liquid.

15. The cooling system as claimed in claim 14, further including a compressed gas supply connected to an atomization module via a first release valve, and a liquid supply connected to the atomization module via a second release valve, the atomization module being operative to generate spray particles.

16. The cooling system as claimed in claim 15, further comprising a radiator and liquid tank where heated spray particles exhausted from the at least one fluid chamber are converted into a liquid for recycling, before the liquid is provided again to the liquid supply.

17. The cooling system as claimed in claim 15, further comprising a heater controller operative to control a power supply for heating up the heater plate, receive temperature feedback from the heater plate, and provide signals for activating the first and second release valves connected to the atomization module, whereby to provide closed-loop control.

18. A bond heat heater assembly comprising:

a heater plate that is operative to heat a die that is being held adjacent to the bond head heater;

at least one fluid chamber, the at least one fluid chamber including an enclosure for containing a fluid, the at least one fluid chamber being thermally coupled to the heater plate to allow heat transfer by thermal conduction;

a fluid inlet and a fluid outlet coupled to the at least one fluid chamber such that fluid is introduced into the at least one fluid chamber through the fluid inlet and exhausted from the at least one fluid chamber through the fluid outlet;

a heat transmission path lying substantially next to the heater plate through which the fluid is configured to flow when the fluid is travelling between the fluid inlet and the fluid outlet, and a partition positioned within the enclosure to define the heat transmission path to increase a flow speed of the fluid as it passes the heater plate.

* * * * *